United States Patent
Hamza

(10) Patent No.: US 7,493,913 B2
(45) Date of Patent: Feb. 24, 2009

(54) SWIMMING POOL VACUUM RELIEF SAFETY VALVE

(76) Inventor: Hassan H. Hamza, 6358 Raylene Ct., Simi Valley, CA (US) 93063

( * ) Notice: Subject to any disclaimer, the term of this patent is extended or adjusted under 35 U.S.C. 154(b) by 424 days.

(21) Appl. No.: 11/076,513

(22) Filed: Mar. 8, 2005

(65) Prior Publication Data

US 2006/0201555 A1    Sep. 14, 2006

(51) Int. Cl.
E04H 4/06  (2006.01)
E04H 4/12  (2006.01)
F16K 24/06  (2006.01)

(52) U.S. Cl. ............ 137/526; 137/514; 4/504; 4/509; 251/64; 417/306

(58) Field of Classification Search ......... 137/514, 137/526; 251/64; 417/306; 4/504, 509
See application file for complete search history.

(56) References Cited

U.S. PATENT DOCUMENTS

| | | | |
|---|---|---|---|
| 398,446 A | | 2/1889 | Pratt |
| 529,865 A | * | 11/1894 | Jensen .................. 417/306 |
| 645,722 A | * | 3/1900 | Holmes ................ 137/543.23 |
| 892,254 A | * | 6/1908 | Hanson ................. 417/306 |
| 1,093,389 A | * | 4/1914 | Ford ...................... 417/306 |
| 1,554,127 A | * | 9/1925 | Roberts .................. 137/539.5 |
| 2,149,777 A | * | 3/1939 | Kidwell .................... 417/306 |
| 3,072,143 A | * | 1/1963 | Fleischhacker ............ 137/514 |
| 4,398,557 A | | 8/1983 | Dugge |
| 4,743,169 A | * | 5/1988 | Funakawa et al. ........... 417/306 |
| 4,817,991 A | | 4/1989 | Frentzel et al. |
| 4,951,701 A | | 8/1990 | Boehmer |
| 5,682,624 A | | 11/1997 | Ciochetti |
| 5,809,587 A | | 9/1998 | Fleischer |
| 5,822,807 A | | 10/1998 | Gallagher et al. |
| 5,991,939 A | | 11/1999 | Mulvey |
| 6,251,285 B1 | | 6/2001 | Ciochetti |
| 6,295,661 B1 | | 10/2001 | Bromley |
| 6,591,863 B2 | | 7/2003 | Ruschell et al. |
| 6,687,923 B2 | | 2/2004 | Dick et al. |

* cited by examiner

*Primary Examiner*—John Rivell
(74) *Attorney, Agent, or Firm*—Kelly Lowry & Kelley, LLP

(57) ABSTRACT

A vacuum relief safety valve includes a housing defining an inner chamber and attached to the suction-side of the swimming pool or spa pump. An air inlet aperture is formed in the housing so as to be open to ambient air. A sealing element is disposed within the housing and biased against the air inlet aperture by a spring so as to effectively seal the inner chamber of the housing from ambient air. When a maximum allowed vacuum level within the pump is exceeded, such as when a swimming pool drain is obstructed, the sealing element moves into the inner chamber and opens the air inlet aperture causing the pump to rapidly lose its prime and enabling removal of the entrapment.

2 Claims, 10 Drawing Sheets

SWIMMING POOL VACUUM RELIEF SAFETY VALVE

BACKGROUND OF THE INVENTION

The present invention generally relates to vacuum relief valves. More particularly, the present invention relates to a vacuum relief safety valve for use in swimming pools, spas and the like which causes the pump to lose its prime if a pre-determined vacuum level is reached in the pump system, such as when an object obstructs the pool's drain.

To maximize enjoyment and maintain proper sanitary conditions, swimming pools must be constantly cleaned of debris, dirt and other contaminants. Pools of various types are known to have one or more suction inlets where pool water is sucked along the line via a pump to filtration, aeration, chemical treatment and other type of equipment prior to being returned to the pool via one or more return outlets.

In more recent pool designs, some of the suction inlets are positioned in the bottom or lower region of the pool. Very recently developed pool systems, known as in-floor cleaning systems, have one or more suction inlets which suck pool water therethrough and any debris of pollutants entrained therein are cleaned from the water by being pumped through filtration and/or treatment station. As with all pools and spas, a high rate of water flow must be achieved in order to maintain an acceptable level of cleanliness. Consequently, a high capacity pump must be employed to draw the water from the pool, with a relatively larger pump generally being required as the size of the pool increases.

Some of the water inlets of such drains have relatively small opening areas and, when large volumes of water being pumped therethrough, very high suction forces at the inlet can be induced. These forces can be so extreme that if a pool user contacts the inlet by any part of their body, they can be held thereagainst, unable to be dislodged, even by excessive force. Such vacuum forces have become so excessive that there have been cases of disembowelment. When the suction inlet is located at or more adjacent to the bottom of a pool, the user can thus be submerged with the risk of drowning or other grievous injury. When such an incident occurs, the vacuum level in the drain line and pool's pump rises sharply.

Occurrences of this type of accident has caused the pool industry to look for solutions that prevent an individual, such as a child, from becoming entrapped at the drain. Some approaches have been by modifying the drain's construction. Examples of this approach include U.S. Pat. No. 5,809,587 to Fleischer and U.S. Pat. No. 6,295,661 to Bromley. However, these devices are fairly complex and expensive to produce. Moreover, these approaches are only acceptable for new pool construction, and are not capable of being incorporated as a retrofit into existing pools and spas.

Yet other approaches involve the insertion of a safety valve into a section line of the filtration pump system. Examples of these include, U.S. Pat. No. 5,682,624 to Ciochetti; U.S. Pat. No. 6,591,863 to Ruschell et al.; and U.S. Pat. No. 6,687,923 to Dick et al. However, this approach also presents many drawbacks. First, such piping is typically submerged below the ground and often encased in or otherwise positioned below concrete. Thus, access to the pipes is not readily obtained unless the safety valve is incorporated into the system when the swimming pool is built. Otherwise, the valves require that the pipe be cut so that the safety valve device can be inserted therein. Cutting these lines increases the opportunity for air leakage in the suction side. Moreover, such installation typically requires professionals having the appropriate tools and ability to install such safety devices.

Oftentimes, these devices also require calibration by experimentation at the pool site such that the safety valve opens only in an excessive vacuum situation. For example, U.S. Pat. No. 5,682,624 includes a manual turn screw for calibrating the valve assembly at the pool site. However, vacuum levels of a specific pump can change from one day to another due to many factors. Moreover, such manual calibration is dangerous if a child were to turn the knob and adjust the calibration such that the safety device did not work properly. Another problem with the '624 device is that it includes many openings which can be filled with water, dirt, insects and other debris. A problem with all such "in-line" systems is that they are typically not close to the pump. The closer one gets to the pump the better the safety device responds to emergencies.

Accordingly, there is a continuing need for a pool safety valve which overcomes the deficiencies described above. The safety valve should be capable of being attached directly to the pump. The safety valve should also be simple enough in design so as to be manufactured inexpensively and installed by the pool owner. The safety valve should also be capable of being used in existing pools as a retrofit. The present invention fulfills these needs and provides other related advantages.

SUMMARY OF THE INVENTION

The present invention resides in a vacuum relief safety valve for a swimming pool or spa pump. The safety valve generally comprises a housing defining an inner chamber and attached to the swimming pool or spa pump, or a suction-side pipe of the swimming pool or the spa, so as to be in fluid communication with the pump. Typically, the housing is threadedly connected to the pump. In a particularly preferred embodiment, the housing is threadedly connected to a drainage port of the pump.

The housing is typically comprised of a base plate and a cap which cooperatively define the inner chamber. The base plate includes an outwardly threadedly extension and an aperture extending through the extension and the base plate and into the inner chamber. The air inlet aperture is typically formed in an end wall of the cap generally opposite the base plate. The air inlet aperture is open to the environment and ambient air.

A sealing element is disposed within the housing and biased against the air inlet aperture so as to effectively seal the inner chamber from ambient air. A spring disposed within the inner chamber of the housing biases the sealing element against the air inlet aperture. The sealing element may comprise a disk, a ball, or any other configuration which effectively seals the air inlet aperture.

The sealing element is adapted to move into the inner chamber and open the air inlet aperture when a maximum allowed vacuum level within the pump is exceeded, such as when the swimming pool or spa drain is obstructed.

In a particularly preferred embodiment, a seat is formed in the housing against which an end of the spring, generally opposite the sealing element, engages. The seat includes a notch or passageway therein to permit water or air to pass therethrough even when the spring is compressed.

Preferably, the sealing element includes an arm extending therefrom having at least a portion thereof biased against the inner wall of the housing to dampen the closing of the sealing element as the vacuum level within the pump decreases. The arm may temporarily engage a ledge formed on the inner wall of the housing to dampen the closing of the sealing element.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
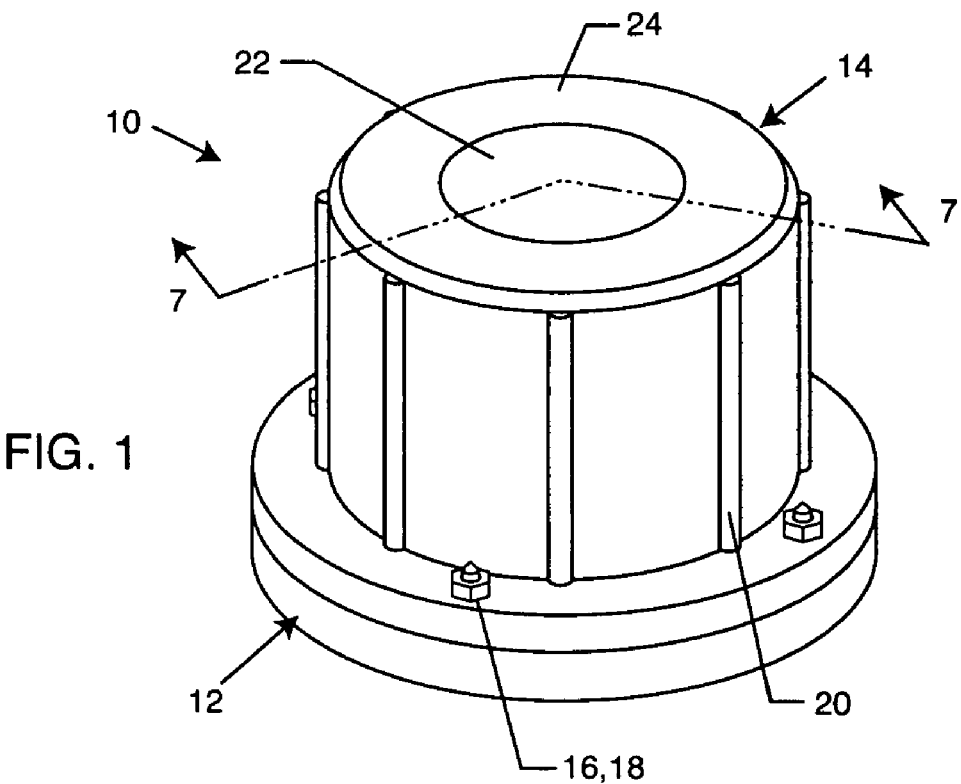
FIG. 1 is a top perspective view of a vacuum relief safety valve embodying the present invention.
Figure 2:
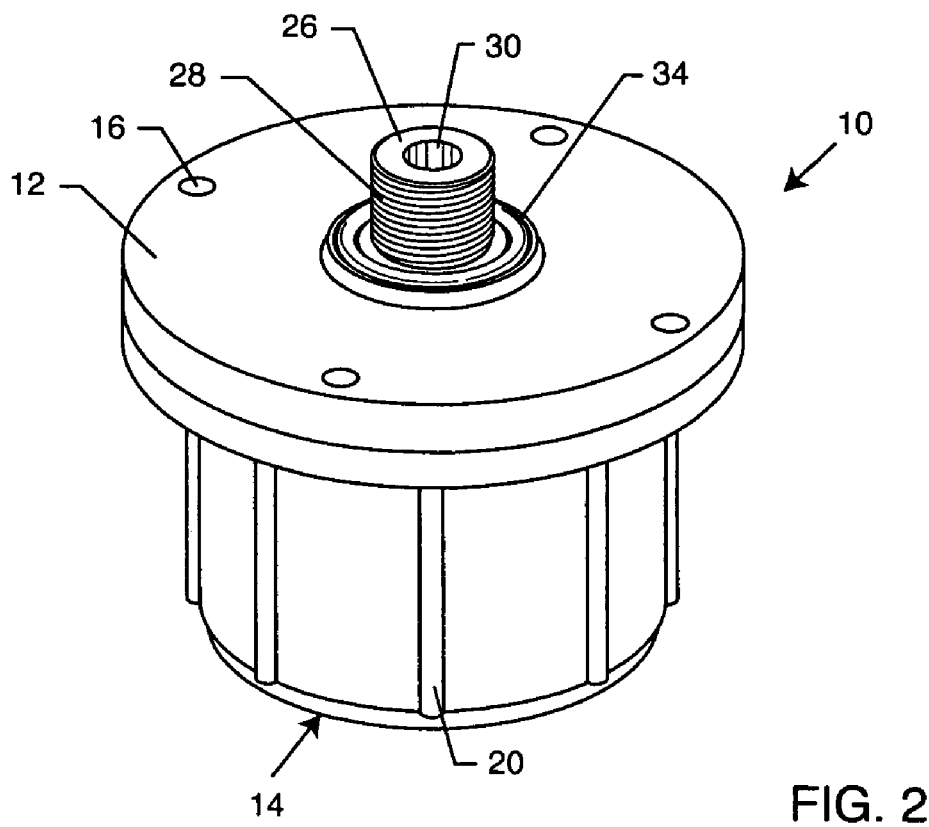
FIG. 2 is a bottom perspective view of the safety valve of FIG. 1.

As shown in the accompanying drawings for purpose of illustration, the present invention resides in a vacuum relief safety valve for a swimming pool or spa pump which is designed to open and introduce ambient air into the pump such that it loses its prime when a vacuum level is exceeded caused by obstruction of a swimming pool drain. When the terminology "pool" or "spa" is used herein, it includes swimming pools, spas, ponds, lakes, etc., especially when the aforementioned have recreational applications. The term "drain" or "inlet" is used throughout the specification and can include one or more inlets or drains of various types. The present invention is particularly suited for residential pools, spas and hot tubs.

With reference now to FIGS. 1-4, a vacuum relief safety valve 10 embodying the present invention is shown. The safety valve 10 typically includes a base plate 12 and an upper cap 14 which are attached to one another, such as by the illustrated bolts and nuts 16 and 18. In a particularly preferred embodiment, as illustrated, the housing includes a plurality of ribs 20 which serve as frictional points and grips such that a homeowner can grasp the safety valve 10 for threaded connection to the swimming pool pump or related equipment, as will be more fully described herein.

In the preferred embodiment illustrated in FIGS. 1-4, an air inlet aperture 22 is formed through the housing, typically in an end wall 24 of the cap 14. At a generally opposite end of the safety valve 10 is an extension 26 which includes exterior threads 28 for insertion into a threaded aperture, such as a drainage port or other threaded port of the pump filtration system, as will be more fully described herein. An aperture 30 extends through the extension 26 and base plate 12 such that fluid flow is possible through the aperture 30 into the interior chamber 32 of the housing and out the air inlet aperture 22 if there is no impedance. Preferably, a seal such as the illustrated O-ring 34 encircles the extension 26 so as to provide a fluid and air tight seal between the safety valve 10 and the pump or piping.

Figure 3:
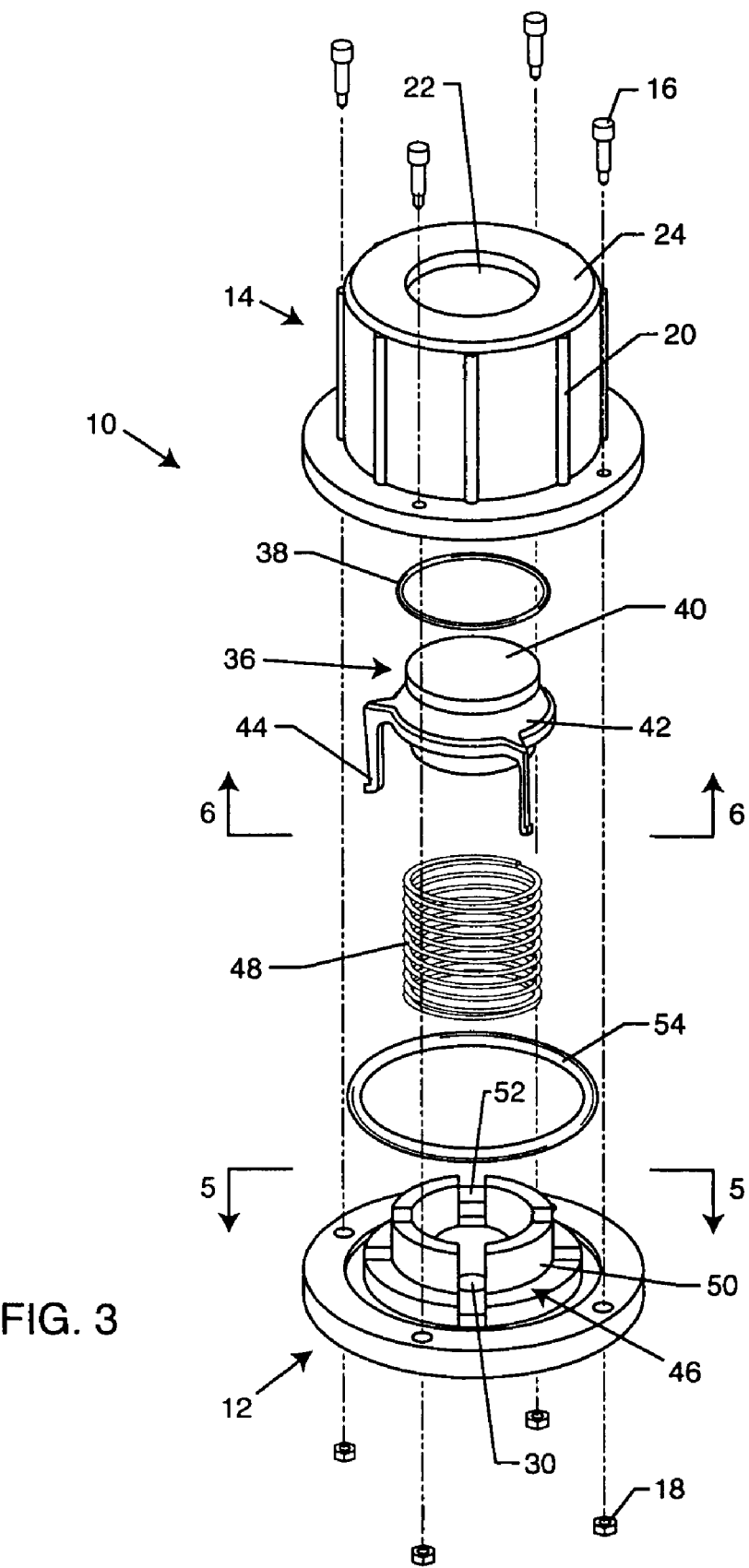
FIG. 3 is a top exploded perspective view of the safety device of FIG. 1, illustrating the various component parts thereof.
Figure 4:
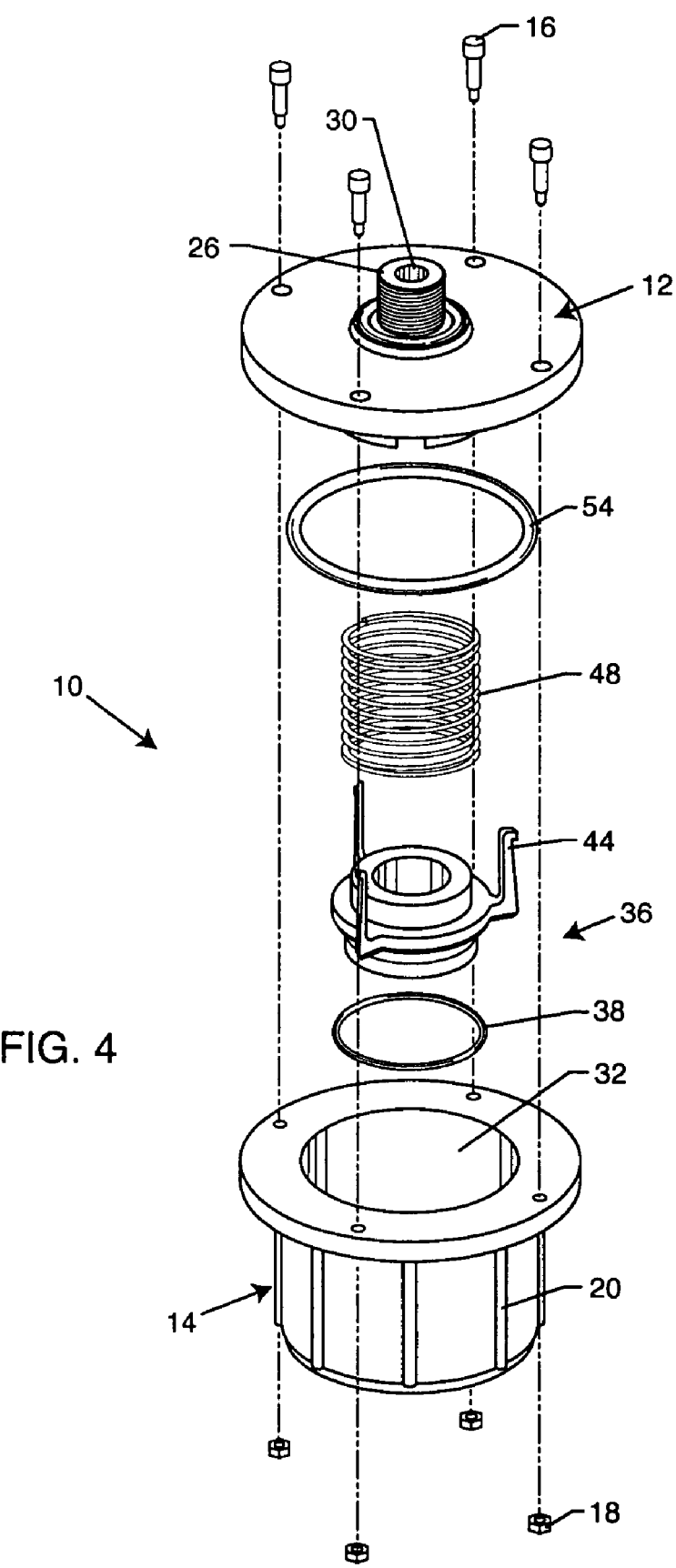
FIG. 4 is an exploded perspective view of the safety valve of FIG. 2.

With reference now to FIGS. 3-6, a sealing element 36 is disposed within the housing and biased upwardly against the upper end wall 24 of the cap 14 so as to seal the air inlet aperture 22. A gasket, such as the illustrated rubber O-ring 38, is disposed between the housing and the sealing element 36 so as to create an air and fluid-tight seal. In a particularly preferred embodiment, the sealing element 36 is of a disc-figuration, as illustrated in FIGS. 3 and 4, so as to include an upper plate portion 40 sized to extend into the air inlet aperture 22, and having a beveled skirt 42 which forms a conic sealing surface for better air tight sealing when it engages the O-ring 38. Arms 44 extend outwardly from the sealing element 36 so as to flex against an inner wall of the housing, as will be more fully described herein.

The base plate 12 includes a seat 46 which supports a spring 48 thereon. The spring is a compression spring so as to extend outwardly away from the base plate 12 and contact the sealing element 36 so as to bias it into engagement with the upper wall 24 of the cap 14 so as to seal the air inlet aperture 22. The seat 46 preferably includes a cylindrical guide 50 which extends into the spring 48 and properly positions the spring 48. The seat 46 preferably includes one or more channels 52, as will be more fully described herein. Typically, a gasket, such as a rubber O-ring 54, is used to seal the base plate 12 and cap 14 such that the housing is air and fluid tight.

Figure 5:
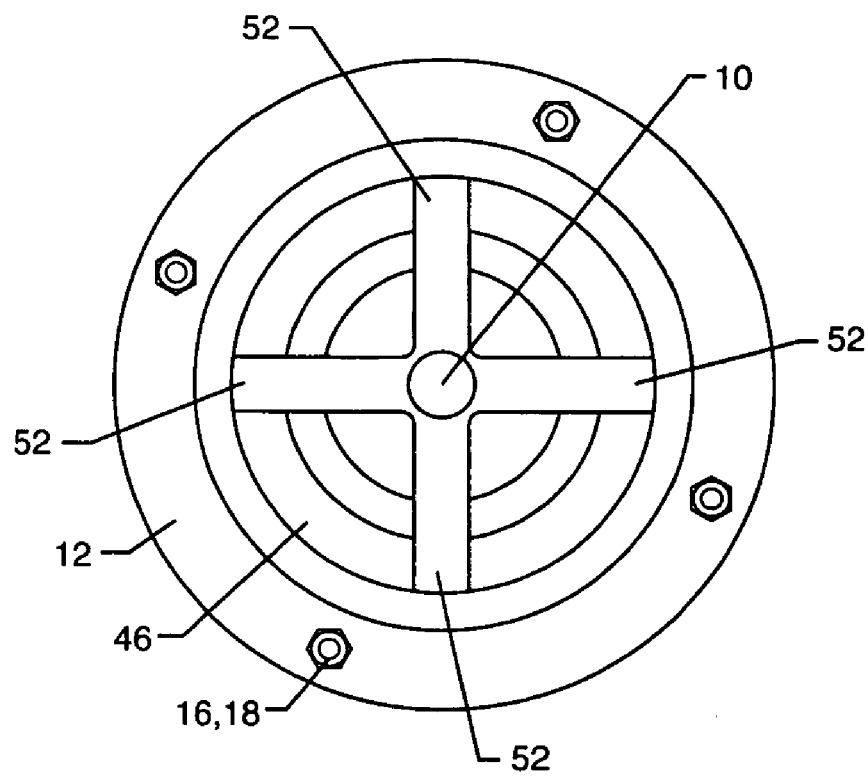
FIG. 5 is a cross-sectional valve taken generally along line 5-5 of FIG. 3.

With reference now to FIG. 5, it is seen how the channels 52 extend through the seat 46 and towards the aperture 30 of the base plate 12. As will be more fully described herein, this allows air to flow from the housing into the pump, even when the spring 48 is completely compressed.

Figure 6:
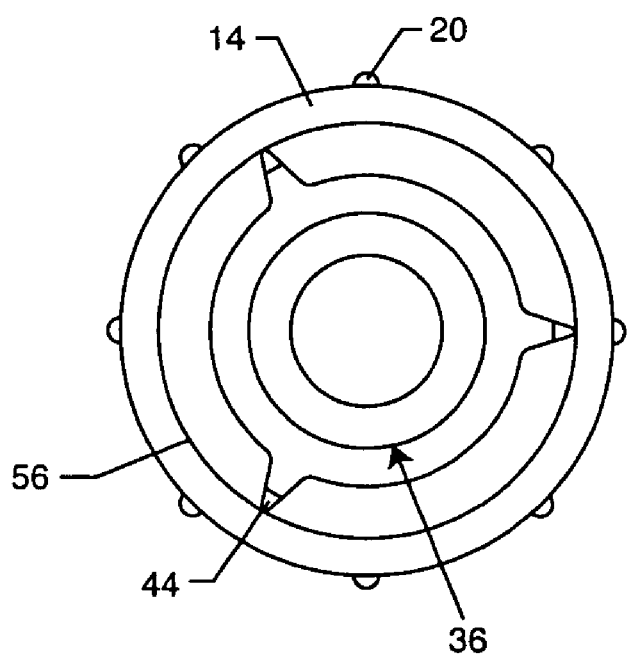
FIG. 6 is a cross-sectional view taken generally along lines 6-6 of FIG. 3.

With reference now to FIG. 6, the sealing element 36 is shown with end extensions of the arms 44 in engagement with the surface of the inner wall 54 of the cap 14 of the housing. As will be more fully described herein, the flexed arms 44 not only serve as a guide for the sealing element 36, but also slow the return of the sealing element 36 once it has been displaced into the housing by an excessive vacuum situation in the pump when a child or object is trapped in a drainage inlet of the swimming pool or spa.

Figure 7:
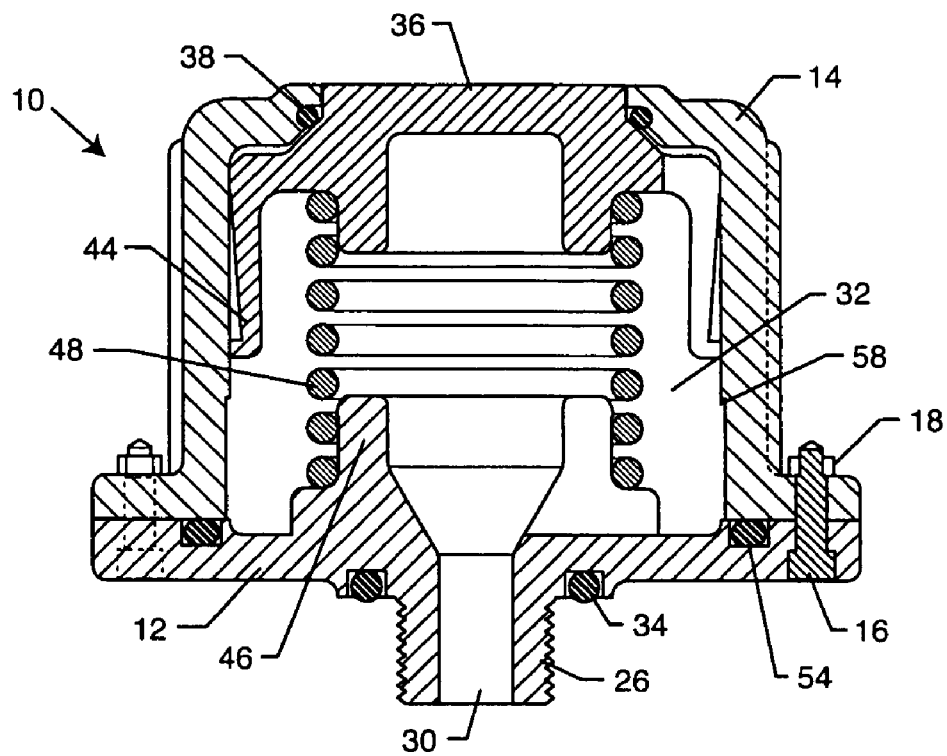
FIG. 7 is a cross-sectional view taken generally along lines 7-7 of FIG. 1, illustrating the safety valve in a closed position.
Figure 8:
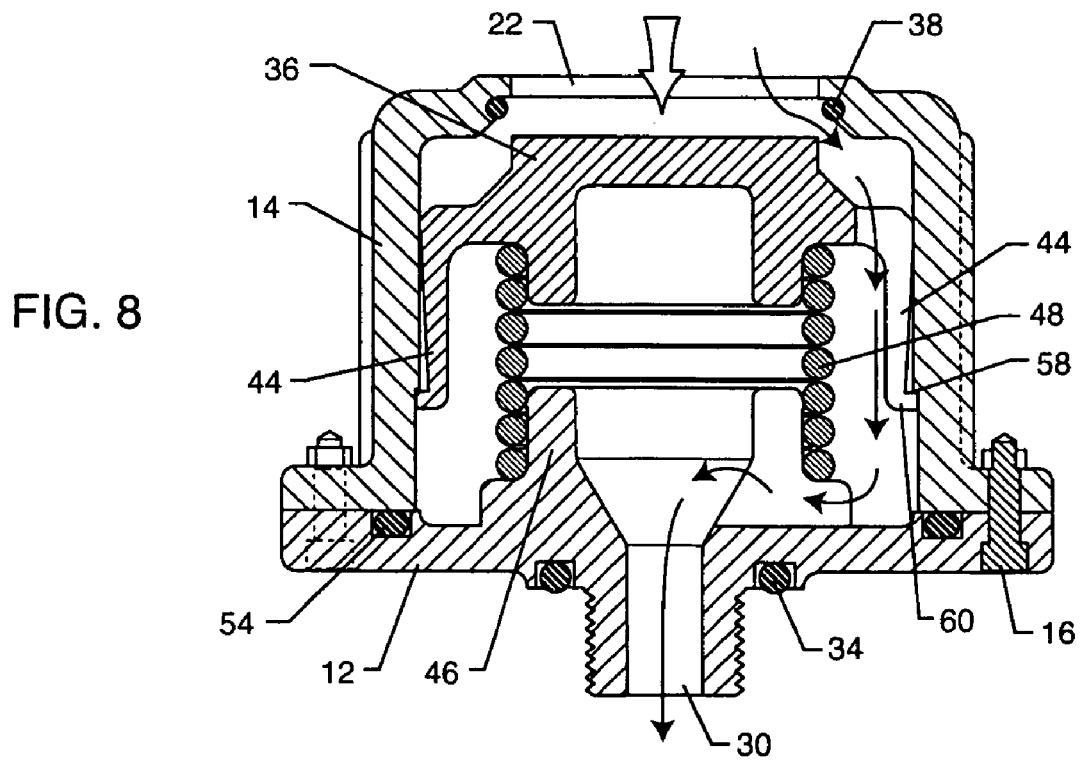
FIG. 8 is a cross-sectional view similar to FIG. 7, but illustrating the safety valve in an open position, permitting air to flow therethrough and into a pump of the swimming pool system.

With reference now to FIGS. 7 and 8, the general operation of the safety valve will now be explained. With reference to FIG. 7, the at rest position of the sealing element 36 is biased upwardly or outwardly such that the upper plate portion 40 extends into the air inlet aperture 22 and the beveled skirt 42 engages the O-ring 38 so as to effectively seal the air inlet aperture 22. This is the standard position for normal operating conditions. For example, when the safety valve 10 is connected to the pump, water from the pump enters aperture 30 and fills the inner chamber 32 of the housing. The sealing element 36 is biased outwardly so as to seal the safety valve 10 while the pump is in normal operation, or is off.

However, with reference to FIG. 8, when a drain or inlet of the swimming pool or spa is obstructed, such as if a child were to be held at the drain port, the vacuum within the pump would significantly increase causing the sealing element 36 to be pulled into the inner chamber 32. The spring 48 would be compressed by such action, and air (illustrated by the directional arrows in FIG. 8) would flow into the safety valve 10 through the air inlet aperture 22 which would now be open. The sealing element 36 is designed so that the air can flow around it as shown in FIGS. 6 and 8. The air then flows through aperture 30 and into the pump, causing it to lose its prime. As can be seen in FIG. 8, even when the spring 48 is completely compressed such that the coils rest upon one another, the air is still able to pass into aperture 30 due to the channels 52 formed in the seat 46.

When the pump loses its prime, the child or other object is able to be removed from the drain or inlet. This causes the high vacuum condition within the pump to return to normal, and thus the spring 48 to begin to bias the sealing element 36 upwardly again. In a particularly preferred embodiment, as illustrated, the arms 44 flex outwardly and into engagement with the inner surface of the cap 14 of the housing to slow the motion of the sealing element 36. A ledge or shoulder 58 can be formed on the inner wall of the cap 14 of the housing such that a protrusion 60 of the arm 44 engages with the shoulder 58. This temporarily stops the sealing element 36 from moving upwardly. Thus, the child or object near the drain is able to be completely moved away from the drain. Otherwise, if the sealing element 36 were to immediately return to its closed position, the object or child may be sufficiently close to the drain in so as to be sucked against it again. However, as the vacuum decreases in the pump, the spring 48 is able to exert sufficient pressure so as to dislodge the arm 44 from the ledge 58 and cause the sealing element to return to its sealed and at rest position, as illustrated in FIG. 7.

The size and characteristics of the spring 48 are dictated by the pool pump. The larger and more powerful the pump, the larger and more powerful the spring 48. This is determined on a pump by pump basis when the safety valve 10 is manufactured. Accordingly, there is no experimentation or adjustment of the safety valve 10 like the prior art. Similarly, there are no adjustment knobs that can be inadvertently adjusted causing the pump to lose its prime when it is not necessary, or even worse resulting in the safety valve not performing when it should, as is the possibility with the prior art.

Instead, the homeowner or service personnel need merely to specify the pump for which the safety valve is to be installed such that the safety valve include the necessary spring that matches the specific pump vacuum level.

Figure 9:
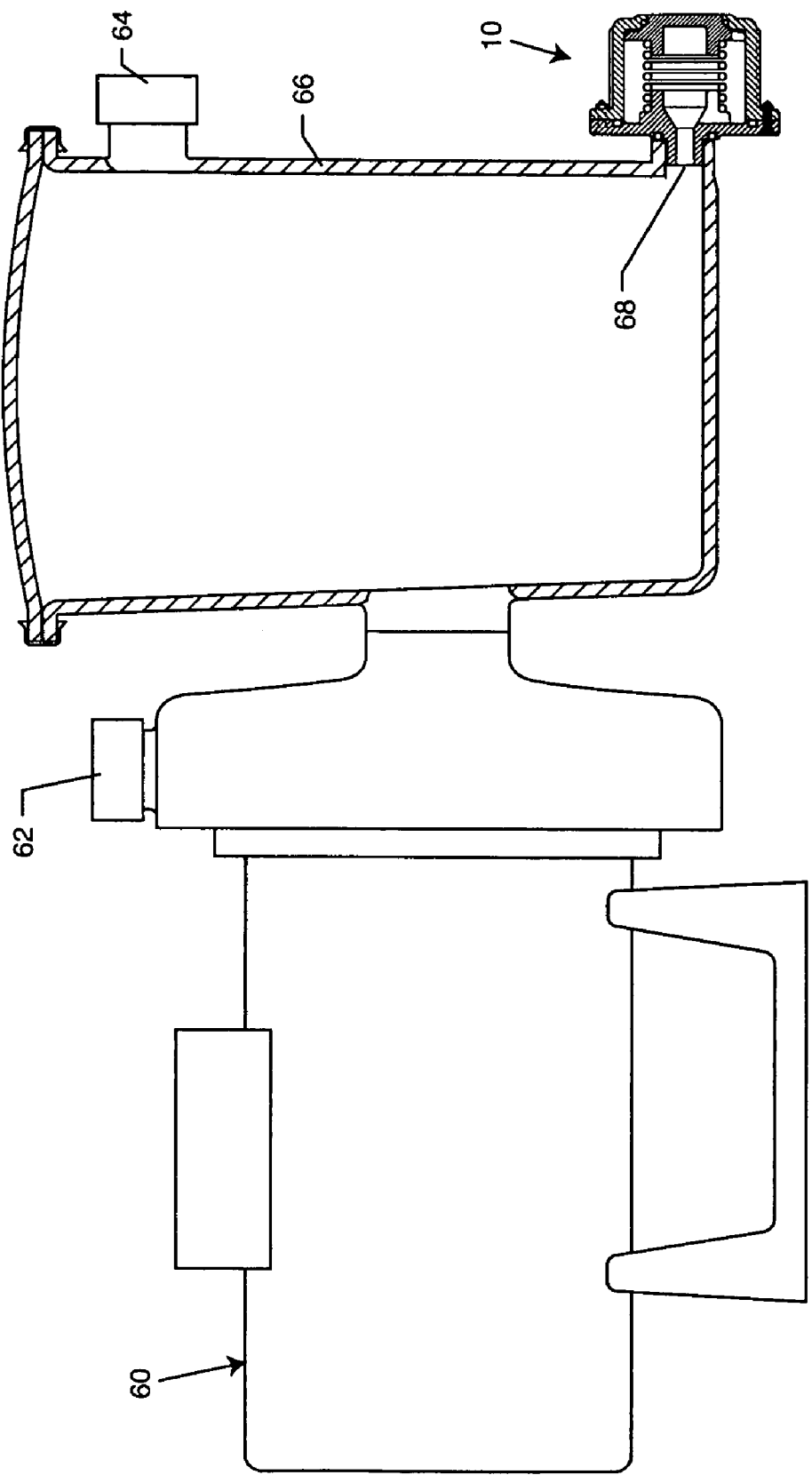
FIG. 9 is a diagrammatic view of a pump having the safety valve of the present invention inserted in a drainage port thereof.

With reference now to FIG. 9, an exemplary diagram of a pump 60 is illustrated. The pump 60 includes a discharge port 62 and a main suction port 64, which in this case is part of a pot 66 attached to the pump 60. In a particularly preferred embodiment, the safety valve 10 of the present invention is threadedly inserted into a threaded aperture 68 which would otherwise hold the drain plug. This has many advantages. First, the safety valve 10 of the present invention is directly attached to the pump 60 itself, lessening the reaction time between the pump high vacuum condition, and the response by the safety valve 10 to cause the pump 60 to lose its prime. Another advantage is that the size of the aperture 68 can be another indicator to specify the pump and safety valve 10. Pumps typically have different diameter drain plug outlets 68. Thus, the threaded extension 26 of the safety valve 10 of the present invention can match the particular pump and will not fit another pump.

Another advantage is that the safety valve of the present invention now serves a dual purpose. In addition to performing the safety function described above, the safety valve 10 also serves as a discharge (drainage) port for winterizing and the like. Typically, a drain plug is threadedly received in the drain port 68. When the pump is not going to be used for prolonged periods of time, or when cold weather is eminent, the drain plug is removed such that the water within the pump drains therefrom. In this case, the pool owner can use his or her finger to push against the sealing element 36 so that it is pushed into the housing, causing the water within the pump to flow out of the pump, through the housing and be discharged. Although the threaded extension 26 is illustrated as being generally centered with respect to the base plate 12, it will be appreciated that the extension 12 can be offset to achieve the same purposes.

Figure 10:
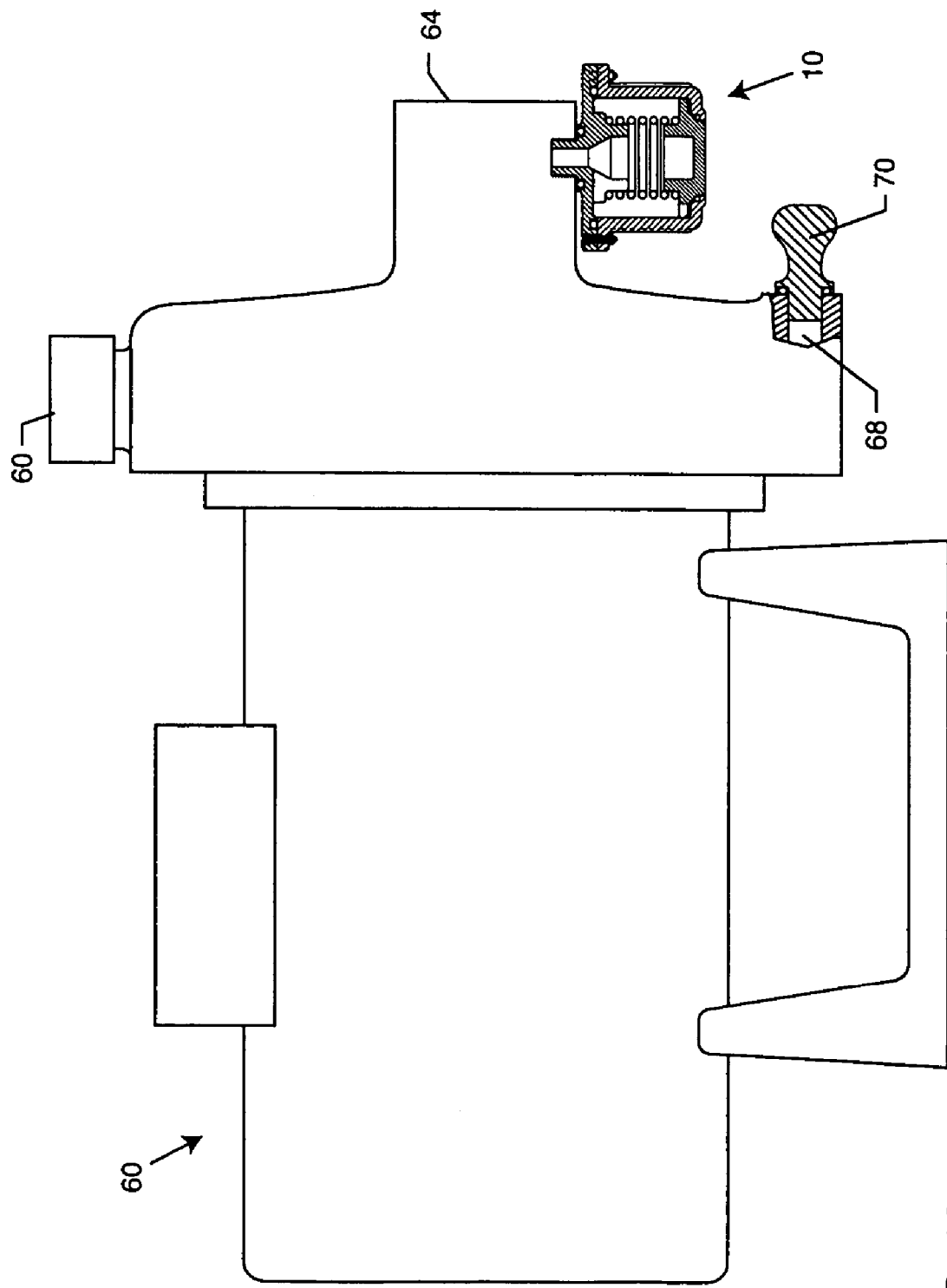
FIG. 10 is a diagrammatic view similar to FIG. 9, but illustrating the safety valve of the present invention attached to another portion of the pump.
Figure 11:
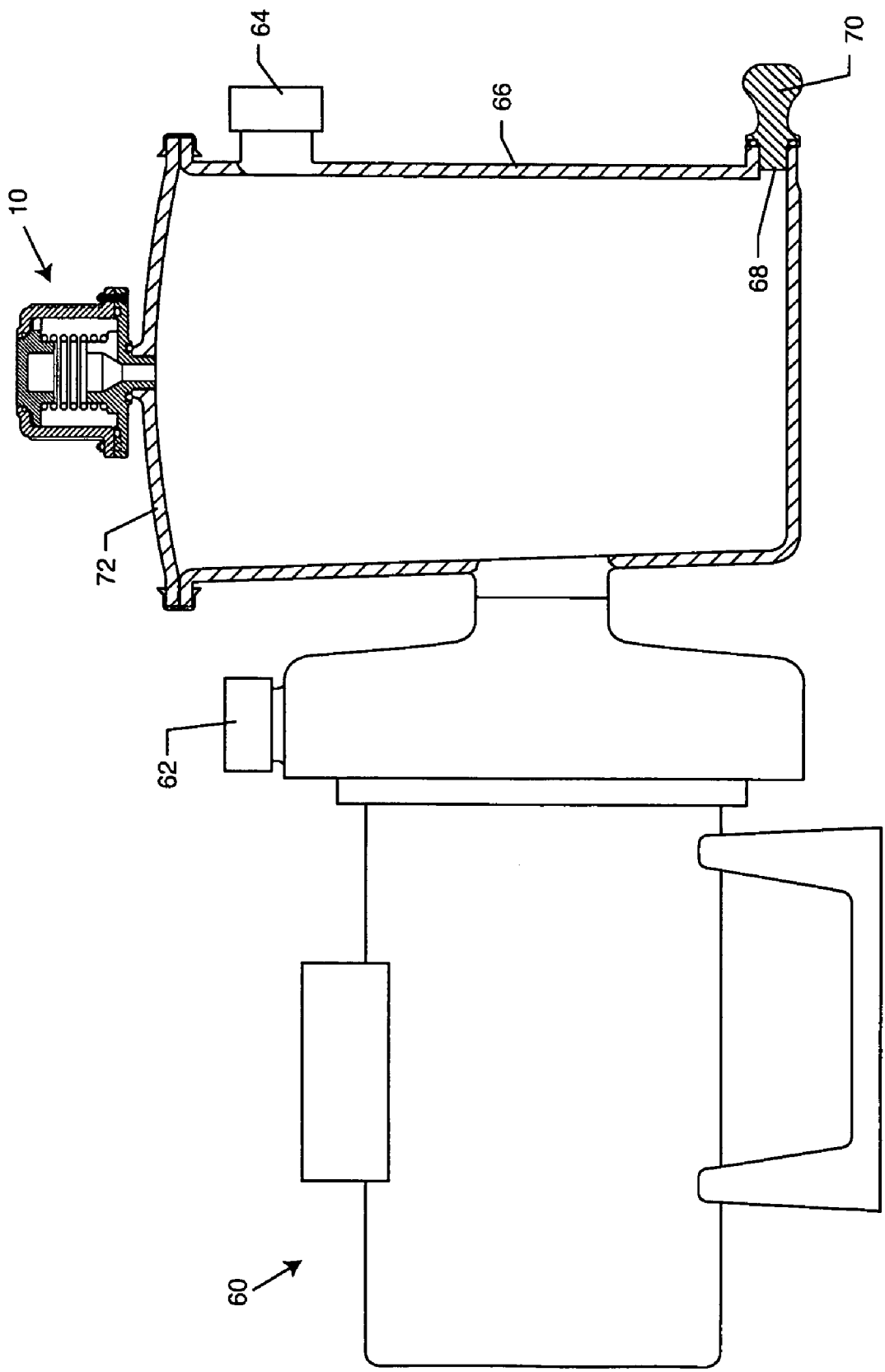
FIG. 11 is a diagrammatic view of a pump having the safety valve of the present invention operably attached thereto.

With reference now to FIGS. 10 and 11, the safety valve 10 of the present invention can also be attached to the pump 60 by other means. A hole can be drilled into the inlet port 64, as illustrated in FIG. 9, or in the pot, such as the lid 72 of the pot 66, as illustrated in FIG. 11. The safety valve 10 of the present invention can be attached thereto, such as by threaded engagement with the internally threaded hole. In such a case, the drain plug 70 would be inserted into the drain aperture 68 in normal fashion. It will be appreciated that the pump manufactures could create the pump 60 or pot 66 so as to incorporate the safety valve 10 of the present invention as original manufacturing (OEM) during the manufacturing of the pump 60 itself.

Although it is preferred to have the safety valve 10 of the present invention directly attached to the pump 60 itself, and most desirably to the drain aperture 68 such that the pool owner can install the safety valve 10 by himself or herself, it is also contemplated that the safety valve 10 could be attached to other parts of the pump and filtration system. That is, for any exposed portions of the piping on the section-side of the pump system. The safety valve 10 of the present invention could be inserted into the pipe. Instead of requiring cuts to the pipe, etc., the piping could merely be drilled and threaded so as to receive the safety valve 10. Alternatively, the safety valve 10 could be sealed using adhesive or the like.

The safety valve 10 described above provides other additional benefits. The valve will typically not need factory repair as it can be easily repaired at the pool site. Practically the only feature that can become compromised over time is the O-rings 34, 38 and 54. The safety valve 10 can be manually removed from the pump or pipe and disassembled so as to replace these O-rings. Such O-rings can be standard off-the-shelf items readily accessible to the homeowner. Preferably, the sealing element 36 is comprised of a material which produces an air tight seal during continuous thermal cycling. A particularly preferred material is frictionless Teflon that precludes the tendency of the sealing element 36 to get stuck with the mating O-ring or gasket 38 even after extended periods of non-use.

Figure 12:
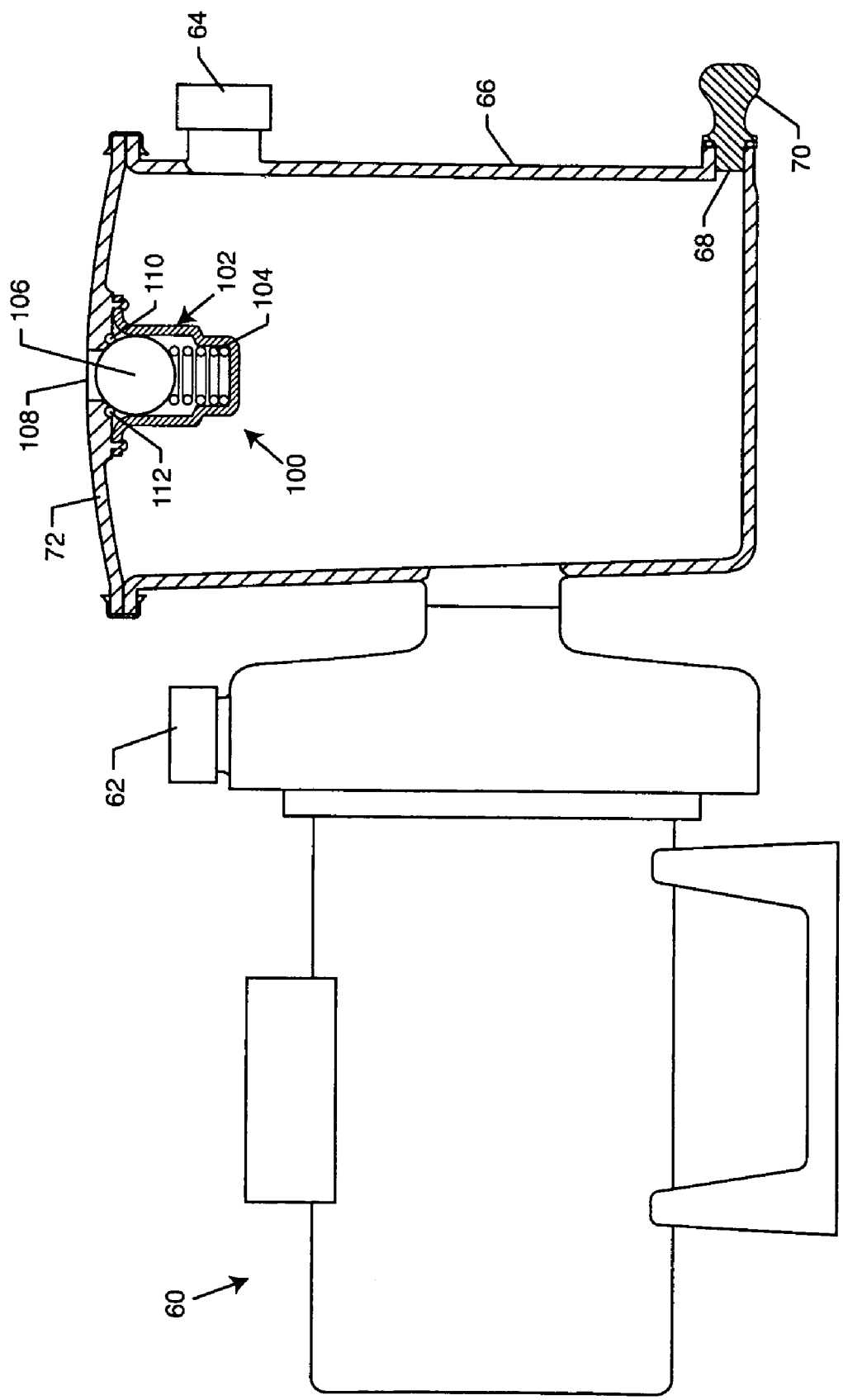
FIG. 12 is a diagrammatic view of a pump incorporating a safety valve embodying the present invention.

With reference now to FIG. 12, another safety valve assembly 100 embodying the present invention is illustrated. This safety valve also includes a housing 102 containing a spring 104 for biasing a sealing member 106 against an air inlet aperture 108. In this case, the sealing element 106 is a ball float which is caged within the housing 102. The ball may be comprised of seamless polyethylene or polyvinyl chloride or any other appropriate material. Although the housing 102 can have a similar structure to that described above, since it is disposed within the pot 66 of the pump 60, it is preferably comprised of an apertured or meshed material. The housing may be bonded or snap-fit, or otherwise connected using connection means 110 to the lid 72 of the pot 66. The air inlet aperture 108 is an aperture formed in the pot's lid 72. A gasket or O-ring 112 forms an air-tight seal with the sealing ball 106 to prevent air from flowing into the pump 60. The operation is similar to that described above wherein when a vacuum level is exceeded, the sealing element 106 is extended into the housing 102 against the bias of the spring 104, causing air to flow through the inlet aperture 108 and into the pump 60 causing it to lose its prime. Of course, it will be appreciated that an arrangement more similar to the safety valve 10 illustrated and discussed above could also be incorporated in the pot 66 to achieve the same purpose.

Figure 13:
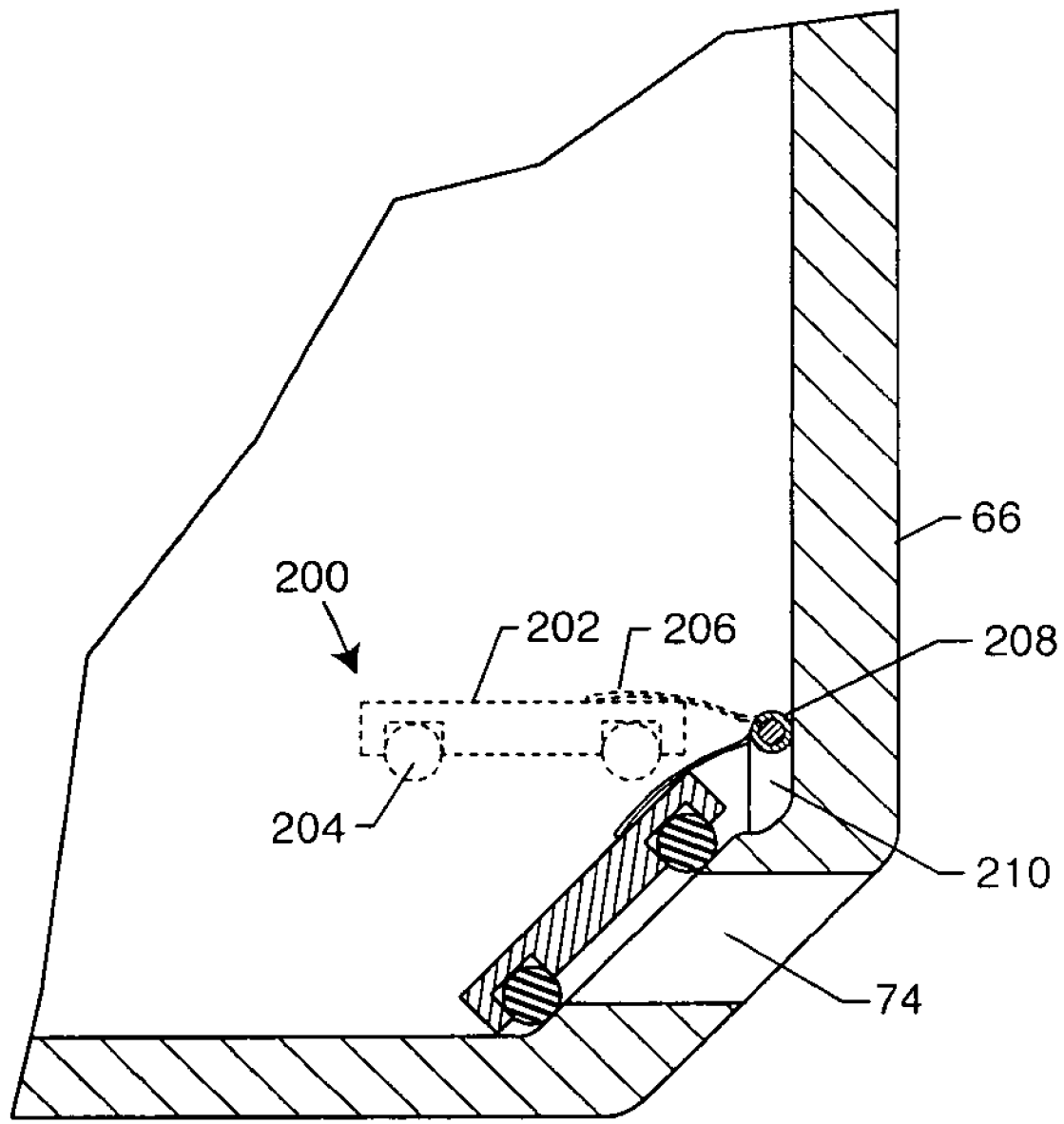
FIG. 13 is an enlarged and fragmented cross-sectional view of a pump having yet another embodiment of the safety valve of the present invention operably attached thereto.

With reference now to FIG. 13, yet another embodiment is illustrated. An aperture 74 is formed in the pot 66, or other structure of the pump 60 or section-side components of the pump filtration system. The safety valve 200 is comprised of a flapper valve 202 having a gasket or rubber O-ring 204. The flapper valve is connected to the pot or other structure with a spring 206 which biases the flapper 202 against the internal sidewall of the pot 66 such that the gasket 204 seals the pot 66. For example, the flapper valve 204 can be mounted between two small standing ribs 210. The ribs 210 are connected to the spring 206 and serve as a pivot point. Preferably, the flapper valve 202 is seated at a 45° angle for quick release of airflow during an emergency. Thus, during an emergency, when the vacuum level within the pump is exceeded, the flapper valve 202 will pivot inwardly, causing apertures 74 to be open and allow air to flow into the pump, causing it to lose its prime. Once the obstruction is removed, the flapper valve 202 will gradually close under the influence of the spring 206. The spring may comprise a helical spring associated with a hinge pin 208 or the like.

The safety valve of the present invention provides many advantages over those disclosed in the prior art. The safety valve of the present invention does not require calibration to experimentation to pool site. There are no complex mechanisms to keep the valve open, and the safety valve of the present invention is simple in design and construction, thus rendering it relatively inexpensive and easy to install and use, The safety valve of the present invention works not only with large water recreational installations, but also residential hot tubs, spas and swimming pools. In fact, the present invention is particularly suited for such residential pools and spas. The safety valve of the present invention does not require electrical wiring or hook-ups, cutting of pipes or specialized tools. The valve is relatively small and easily retrofitable on most pump filtration systems of pools, spas and hot tubs.

Although several embodiments have been described in detail for purposes of illustration, various modifications may be made to each without departing from the scope and spirit of the invention. Accordingly, the invention is not to be limited, except as by the appended claims.

What is claimed is:

1. A vacuum relief safety valve for attachment to a pump for a swimming pool or spa wherein the pump includes:
   a pot having a hollow interior;
   an inlet port through which water from the pool or spa enters the pot under vacuum created by pump suction;
   an outlet port and an internally threaded drain port for receiving a removable matingly threaded drain plug;
   the vacuum relief safety valve comprising:
   a valve housing extending in an axial direction defining an enclosed inner chamber;
   a base plate at one axial end of the valve housing having an externally threaded extension projecting from the base plate for mating engagement with the drain port to attach the housing to the pump upon removal of the drain plug, and a passage in said extension and said base plate placing said pot interior and said valve chamber in fluid communication;
   an air inlet aperture formed in the housing and open to ambient air; and
   a sealing element disposed within the housing and biased against the air inlet aperture so as to effectively seal the inner chamber from ambient air, and adapted to move into the inner chamber and open the air inlet aperture if a maximum allowed vacuum level within the pump is exceeded.

2. A method of providing safety vacuum relief in a swimming pool or spa system of the type comprising a suction line extending from a drain in the pool to a pool pump; the pump including a hollow pot having an inlet port connected to the suction line for receiving water drawn in by vacuum created by pump suction, an outlet port for returning water to the pool or spa, and a threaded drain port matingly engaged by a removable threaded drain plug;
   the method comprising the steps of:
   providing a safety relief valve having a housing defining an enclosed inner chamber having spaced apart ends defined by a base plate and a cap wherein the base plate has an externally threaded extension projecting axially away from the housing;
   and wherein the cap end has an air inlet aperture which is normally closed by a sealing element slidably mounted within the chamber biased into sealing contact against a seat in the housing around the aperture by a spring which is preset to permit the sealing element to unseat and open the aperture at a predetermined maximum level of vacuum within the chamber;
   and wherein a passage extends through the extension into the inner chamber;
   unthreading and removing the drain plug from the drain port at a time when the pump is not operating;
   installing the safety relief valve by threading the extension into the drain port to mount the housing to the pump with fluid communication between the interior of the pot and the inner chamber of the valve;
   whereby if thereafter, at a time when the pump is operating, the level of vacuum in the suction line exceeds the preset maximum value, the valve opens to vent the vacuum in the suction line to ambient air.

* * * * *